(No Model.)

A. R. BYRKETT.
Earth Scraper.

No. 231,148. Patented Aug. 17, 1880.

Attest:
H. D. Perrie,
D. P. Cowl

Inventor.
A. R. Byrkett
By Chas J. Gooch
Atty.

UNITED STATES PATENT OFFICE.

AHIJAH R. BYRKETT, OF TROY, OHIO.

EARTH-SCRAPER.

SPECIFICATION forming part of Letters Patent No. 231,148, dated August 17, 1880.

Application filed July 2, 1880. (No model.)

*To all whom it may concern:*

Be it known that I, AHIJAH R. BYRKETT, a citizen of the United States, residing at Troy, in the county of Miami and State of Ohio, have invented certain new and useful Improvements in Earth-Scrapers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an attachment for application to the scoops of earth-scrapers; and it consists in constructing of one piece of metal a knife or scraper and upwardly-extending ears or side plates for attachment to the sides of the scoop-body, for the purpose of strengthening the same at the portion subjected to the greatest wear and strain in the operation of scraping the earth.

The scraper-plate gradually decreases in thickness from back to front, and the ears are, at their base, of a width equal to the width of each end of the scraper-blade, and narrowing upwardly to produce a triangular shape. The rear edge of each ear is preferably straight, while the front edge of each is of curved form, to aid in the scooping of the earth. To these plates or ears, on each outer side, are secured (preferably by welding) projecting pins, to which the draft and guiding mechanism may be attached, for the purpose of relieving the scoop-body from undue strain.

Figure 1:
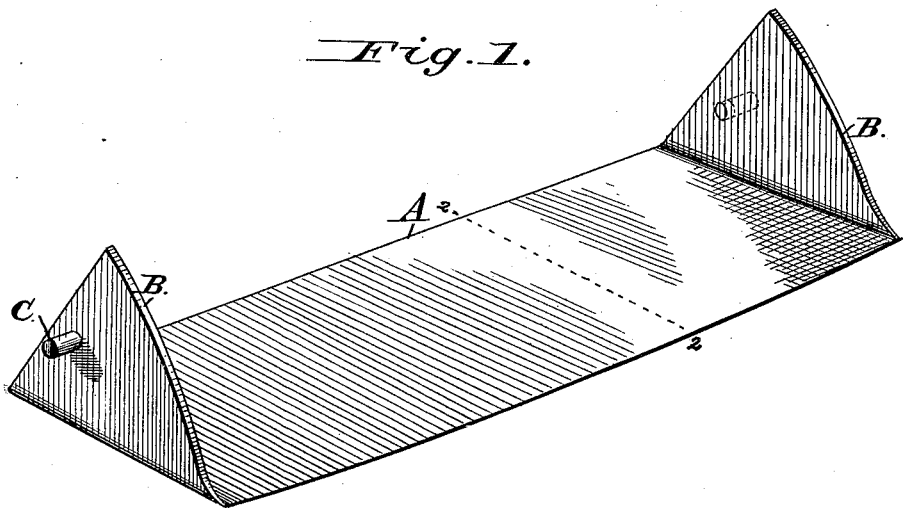
Figure 2:
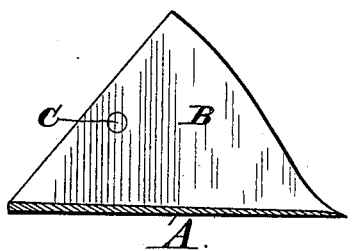

In the drawings, Figure 1 represents a perspective view of the attachment, and Fig. 2 a cross-section thereof on the line 2 2 of Fig. 1.

A is the knife or scraper, formed as shown, and gradually diminishing in thickness from back to front, to increase its scraping qualities. B B are ears or side plates, formed in one piece with the scraper out of some suitable material, such, for instance, as wrought steel or iron. These plates extend upwardly from each end of the scraper, as shown in the drawings, and are at their bases of equal width to the width of the scraper-blade.

The inner or rear edge of each ear or plate B may be straight, while the front or outer edge is curvilinear, and is sharper at its lower part, to assist in the scraping operation. The edges of these plates gradually approach each other upwardly until a triangular shape is imparted to the plates, the inner face of which is intended to rest directly against and be secured to the outer sides of the scoop-body.

C C represent pins, preferably welded to the ears or plates B, and projecting outwardly from the outer sides thereof. To these pins may be attached the bail-arms and the handles for guiding and operating the scoop, or additional pins may be secured to the ears B where it is desired to attach the bail and handles to the ears separately.

It is well known that the greatest wear and strain upon a scraper is at its forward portion, where it comes into direct contact with the earth being scraped or with the mass as it is being loosened. It is the office of these ears B to provide for this by strengthening the scoop at this precise point.

With the combined cutter and side-strengthening ears B above described it will be possible to construct the scoop-body of light material—such, for instance, as thin sheet metal—as but little strain would be exerted upon it, it merely being necessary to form the scoop of sufficient strength to resist the weight of the load of earth. It has also been found in practice that the attachment directly to the scoop-body, by means of pins or pivots passing therethrough, of either the bail or handles is very objectionable, as it is necessary to prevent such pins tearing out in use, which they are apt to do, either to make the scoop-body of very stout material, and thereby render it very heavy, or else attach to the body strengthening-plates, to which the bail or handles are secured; but such plates have not strengthened the machine where the scraping is done. These objectionable features are entirely overcome by the use of my attachment, as the front of the scoop-body, where the greatest wear and tear is met with, is strengthened by the ears B; and by attaching the bail and handles to the pins C all strain from the hauling and guiding mechanism is taken from the scoop-body and transferred to the strongest part of the machine.

The attachment is capable of easy application to scoop-bodies generally, no special construction of scoop nor any previous preparation thereof being necessary to adapt it to receive this attachment, and its use would admit of a very simple and light construction of scoop being rendered very efficacious.

Should the scraper-blade become damaged it can readily be removed and replaced by another without injury to or necessitating the replacement of any other portion of the machine.

Having thus described my invention, what I claim, and desire to secure by Letters Patent, is—

As an article of manufacture, the attachment herein described for application to earth-scrapers, consisting of the knife or scraper A and the ears B, formed in one piece, said ears being at their base of equal width to the width of the knife and narrowing upwardly therefrom, and having a curved front edge and provided with pivot-pins C, substantially as and for the purpose set forth.

AHIJAH R. BYRKETT.

Witnesses:
CHAS. J. GOOCH,
HUBERT A. GIBBS.